(12) United States Patent
Neeley

(10) Patent No.: US 8,352,275 B2
(45) Date of Patent: Jan. 8, 2013

(54) METHOD AND SYSTEM FOR SIMULATING A CROSS-CULTURAL COMMUNICATION DYNAMIC

(75) Inventor: Tsedal Beyene Neeley, Cambridge, MA (US)

(73) Assignee: Global Matters, LLC, Cambridge, MA (US)

( * ) Notice: Subject to any disclaimer, the term of this patent is extended or adjusted under 35 U.S.C. 154(b) by 372 days.

(21) Appl. No.: 12/576,860

(22) Filed: Oct. 9, 2009

(65) Prior Publication Data

US 2011/0087480 A1    Apr. 14, 2011

(51) Int. Cl.
*G10L 21/00* (2006.01)
(52) U.S. Cl. .................................. 704/270; 348/14.08
(58) Field of Classification Search ................. 704/1–10, 704/270, 270.1, 275; 725/117; 348/14.08–14.1
See application file for complete search history.

(56) References Cited

U.S. PATENT DOCUMENTS

| | | | |
|---|---|---|---|
| 5,546,304 A * | 8/1996 | Marschner et al. | 704/4 |
| 5,715,468 A * | 2/1998 | Budzinski | 704/9 |
| 6,339,755 B1 * | 1/2002 | Hetherington et al. | 704/8 |
| 6,622,123 B1 * | 9/2003 | Chanod et al. | 704/277 |
| 6,738,738 B2 * | 5/2004 | Henton | 704/2 |
| 7,085,719 B1 * | 8/2006 | Shambaugh et al. | 704/251 |
| 7,593,849 B2 * | 9/2009 | Das et al. | 704/224 |
| 7,653,543 B1 * | 1/2010 | Blair et al. | 704/270 |
| 8,036,893 B2 * | 10/2011 | Reich | 704/257 |
| 8,090,570 B2 * | 1/2012 | Waibel et al. | 704/2 |
| 2005/0128283 A1 * | 6/2005 | Bulriss et al. | 348/14.1 |
| 2006/0259307 A1 * | 11/2006 | Sanders et al. | 705/1 |
| 2007/0285504 A1 * | 12/2007 | Hesse | 348/14.08 |

\* cited by examiner

*Primary Examiner* — Abul Azad
(74) *Attorney, Agent, or Firm* — Jeffrey Schox

(57) ABSTRACT

One embodiment of the invention is a method for simulating a cross cultural communication dynamic between participants. The simulation includes the steps of distributing unique subsets of the information set to the participants, assigning the participants to a first communication group that represents people for whom a lingua franca is a first language and to a second communication group that represents people for whom the lingua franca is a second language, providing a communication platform that facilitates communication between the participants of the simulation to assemble the unique subsets of the information set, and selectively disadvantaging the communication through the communication platform between a subset of participants.

21 Claims, 7 Drawing Sheets

| Output to: / Input from: | Participant 1 Member of the First Communication Group | Participant 2 Member of the First Communication Group | Participant 3 Member of the Second Communication Group | Participant 4 Member of the Second Communication Group |
|---|---|---|---|---|
| Participant 1 Using the "Lingua Franca" | Original Input | Original Input | Disadvantaged | Disadvantaged |
| Participant 2 Using the "Lingua Franca" | Original Input | Original Input | Disadvantaged | Disadvantaged |
| Participant 3 Using the "Lingua Franca" | Disadvantaged | Disadvantaged | Original Input | Slightly Disadvantaged |
| Participant 4 Using the "non-Lingua Franca" | Unintelligible | Unintelligible | Original Input | Original Input |

FIGURE 2

METHOD AND SYSTEM FOR SIMULATING A CROSS-CULTURAL COMMUNICATION DYNAMIC

BACKGROUND AND SUMMARY

In the current global economy, collaboration across national, language, and cultural boundaries is increasingly common. To communicate with other members of a collaborative cross-cultural group, a lingua franca (or, common language) is typically used. The lingua franca may be the native tongue for some members of the group and a second, or even third, language for other members of the group. In this document, the phrase "second" or "third" language refers to any language learned after the native tongue (the "first" language). As a result, communication problems arise between native speakers of the lingua franca and non-native speakers of the lingua franca. This is particularly problematic under situations with psychological pressure, such as those that require the completion of a task with a time deadline in business organization or in schools. Examples of such communication problems include non-native speakers not fully understanding a native-speaker, the native-speaker becoming impatient with the non-native speakers, native speakers resorting to communicating with other native speakers and thus isolating the non-native speaker, non-native speakers resorting to communicating with other non-native speakers with similar language backgrounds and thus isolating the native speaker, along with other psychological and/or communication efficacy problems.

The insight that lead to the development of this invention was that one or more of these problems may be abated or avoided if members within the cross-cultural group are familiar with the frustrations felt by members of the group with different language backgrounds, in particular, if a native speaker of the lingua franca understood the frustrations felt by a non-native speaker of the lingua franca. However, it is difficult for a native speaker of the lingua franca to comprehend the frustrations that may be felt by a non-native speaker if the native speaker has never experienced the need to communicate in a second language that is not their native language. It is also difficult to comprehend the source of frustrations that may be felt by a native speaker of a lingua franca during communication with a non-native speaker of the lingua franca. This invention provides a method for simulating this cross-cultural dynamic between multiple participants.

One embodiment of the invention is a method for simulating a cross-cultural communication dynamic between participants. The simulation includes the steps of distributing unique subsets of the information set to the participants, assigning the participants to a first communication group that represents people for whom a lingua franca is a first language and to a second communication group that represents people for whom the lingua franca is a second language, providing a communication platform that facilitates communication between the participants of the simulation to assemble the unique subsets of the information set, and selectively disadvantaging the communication through the communication platform between a subset of participants.

In a particular example of the embodiment, a communication platform distributes unique subsets of an information set to each of the participants of the simulation and assigns the participants to either the first communication group or the second communication group. The participants are then tasked with assembling the unique subsets of information to obtain the complete original information set. The participants use the provided communication platform to attempt to communicate their unique information to the other participants of the simulation by providing communication inputs through the communication platform. The communication platform selectively manipulates the communication inputs before outputting the communication to subsets of the participants. Because of the manipulation and the increased level of interpretation difficulty of select communication to a subset of the participants of the simulation, the participants must distinguish and extract the original information set from the manipulated communication of information. A particular participant may be assigned to the task of assembling all the information provided by the other participants. Roles may also be assigned to each of the participants of the simulation to create communication relationships that are substantially similar to those seen in communication between people of different language and/or cultural backgrounds.

A stimulus may also be provided to the participants of the simulation to increase the desire to complete the assembling of the original information set. The stimulus may also be provided to increase the desire to assemble an accurate complete original information set. An example of a stimulus may be a time constraint, such as the participants of the simulation must assemble the subsets of information into a complete information set within fifteen minutes. Alternatively, or, in combination, an additional task of presenting the final assembled information set to a third party (for example, a fictional investor in the company) may be provided for stimulus. However, any other suitable stimulus may be provided by the simulation to increase the desire of the participants to complete the assembling of the complete information. In addition, participants may be allowed to provide their current emotional status throughout the course of the simulation to provide feedback for future analysis, for the other participants in the simulation, or any other suitable purpose or party. The feedback may be used in future analysis to facilitate in the understanding of the emotions felt by each participant during the simulation and how the emotions may relate to those felt by people communicating in a group with people of varied language and/or cultural backgrounds.

As described below, communication between participants of the first communication group in the lingua franca is preferably not disadvantaged and is substantially more intelligible than communication from a participant in the second communication group to a participant in the first communication group. As the simulation continues, participants in the first communication group may find it easier and more efficient to communicate directly with other participants in the first communication group and may be inclined to decrease direct communication with the participants in the second communication group. Additionally, participants in the second communication group may find it difficult to communicate with participants in the first communication group (for example, the participants in the first communication group who do not seem to understand what the participant from the second communication group is trying to communicate). As the simulation continues, the participants in the second communication group may be inclined to select the alternative communication mode (in, for example, their native language), which allows them to communicate with other participants in the second communication group with increased ease, but isolate the participants of the first communication group. The tendencies to isolate participants simulates the cross-cultural communication dynamics that include as speakers of a common language that is not the lingua franca may communicate to each other using the common language that is not the lingua franca in order to communicate faster, leaving non speakers of the common language that is not the lingua franca in confusion and/or frustration, and/or native speakers of the lingua franca may communicate in a much faster pace with each other, leaving non-native speakers of the lingua franca in confusion and/or frustration. Such communication dynamics are particularly more common in scenarios where there is a stimulus to complete the communication of information is present, for example, the stress experienced when under a time constraint.

In one variation, one or more of the participants may represent people that have proficiencies in the lingua franca and in the non-lingua franca. In this simulation scenario, this participant may be inclined to function as a translator of communication between other participants in the first communication group and the second communication group. This may allow for increased communication efficiency between participants of the simulation, but may take additional time for communication to be completed. In the variation where a time constraint is provided, the additional time use for translation may be undesirable and may, again, encourage participants to communicate directly to other participants of their communication group and isolate participants in other communication groups.

The simulation may also function to teach the participants of the simulation how to more effectively communicate with people of different language and/or cultural backgrounds. For example, comprehension of communication in a lingua franca for a person for whom the lingua franca is not the native language may be increased if the communication is delivered in a slow and/or enunciated manner. The communication platform may encourage such practice by decreasing the degree of disadvantaging of communication when slower and/or more enunciated communication is delivered (for example, slower input of textual communication, better enunciation of syllables in an audio communication, usage of simpler vocabulary, or avoidance of ambiguous vocabulary). In a second example, comprehension of communication within a group with people of any type of language background may be increased if the emotions of the members of the group are calm and patient as opposed to frustrated, impatient, or stressed. The communication platform may function to encourage calmer and more patient emotions by decreasing the degree of disadvantaging of communication when the reported emotions of the participants of the simulation are generally more positive. However, any other suitable means of teaching any other suitable methods for effective communication may be used.

The below description of the preferred embodiments of the invention is not intended to limit the invention to these preferred embodiments, but rather to enable any person skilled in the art to make and use this invention.

BRIEF DESCRIPTION OF THE FIGURES

FIG. 2 is a table representing the communication between the participants assigned into groups within the simulation.

DESCRIPTION OF THE PREFERRED EMBODIMENTS

Figure 1:
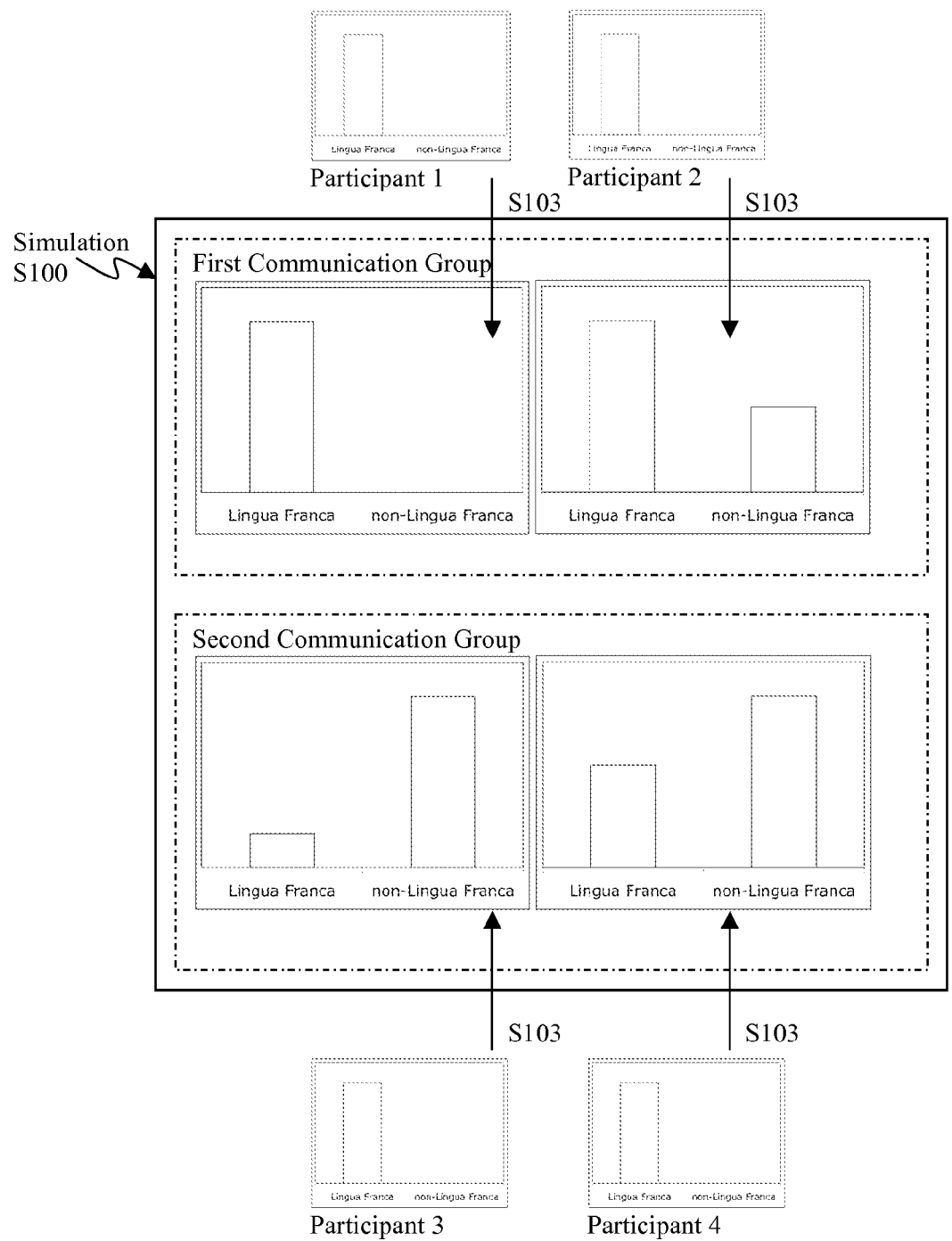
FIG. 1 is a representation of the assignment of participants into groups within the simulation.

As shown in FIGS. 1, 3a, 3b, and 3c, the method of simulating S100 of the preferred embodiments of the invention include the steps of assigning the participants to a first communication group that represents people for whom a lingua franca is a first language and to a second communication group that represents people for whom the lingua franca is a second language Step S103, providing a communication platform 110 that facilitates communication between the participants of the simulation to assemble unique subsets of an information set Step S105, and selectively disadvantaging the communication through the communication platform between a subset of the participants Step S107. As shown in FIG. 5, the method of simulating S100 of the preferred embodiments may also include the step of distributing unique subsets of the information set to the participants Step S101.

The method of simulating S100 of the preferred embodiments is preferably provided to participants with knowledge of a single language that may commonly be used as a lingua franca during the simulation, for example, English. The participants may be students, employees of a business, teachers, caretakers, medical practitioners, or any other suitable participant that may benefit from and/or desires knowledge of cross-cultural communication dynamics within a group of people of varied language backgrounds. The participants may also benefit from and/or desire knowledge of communication dynamics within a group of people who speak the same language but are of varied cultural backgrounds, for example, an American native English speaker communication with a British native English speaker, a Singaporean native English speaker, and/or a non-native lingua franca speaker with high proficiency in the lingua franca but is from a different cultural background with different customs in speech, body language, and/or communication patterns. In a first example, the participants may be students of a business degree that are familiarizing themselves with communication scenarios that they may encounter during a business communication that may occur while working for a multinational company. In a second example, the participants may be teachers that are learning how to effectively communicate with and/or teach students for whom the lingua franca of the classroom and/or the lesson is not the native language or wherein the teacher and the student have different native languages. In a third example, the participants may be young students (such as kindergarten age students) that are first encountering other people with a different native language (such as a fellow student) and their teacher administers the simulation to facilitate the students in understanding the difficulties that their fellow student may be experiencing. In a fourth example, the participants may be medical practitioners (such as a nurse or a doctor) that are learning how to effectively communicate medical information and/or instructions or any other suitable type of information with a patient with a different native language. In a fifth example, the participants may be corporate employees that are learning interpretation differences between native speakers of the lingua franca with varied cultural backgrounds. However, the simulation S100 may be used with any other suitable participant.

Step S103 includes assigning the participants to a first communication group that represents people for whom a lingua franca is a first language and to a second communication group that represents people for whom the lingua franca is a second language. This step functions to create a communication relationship between the participants of the simulation. Assigning the participants to the first and second communication groups may function to provide a communication relationship to a participant that the participant may not otherwise have experienced, for example, providing a participant for whom a common lingua franca (such as English) is their first (and possibly sole) language with a communication relationship of communicating in a lingua franca that is not their native language by assigning the participant to the second communication group. Assigning the participants to the first and second communication groups may also function to allow a participant to revisit a communication relationship that the participant has experienced before, for example, allowing a participant for whom a common lingua franca (such as English) is their first (and possibly sole) language to revisit a communication relationship of communicating with another person for whom the lingua franca is not their native language.

The second communication group preferably represents people for whom the lingua franca is a second language. The second communication group also preferably represents people that have a common native language and are capable of communicating comfortably with each other using this common native language. Alternatively, the second communication group may represent people with different native language backgrounds. The second communication group preferably represents people with equal proficiency in the lingua franca, but may alternatively represent a group of people where each person has a different level of proficiency in the lingua franca. In another version, the participants may also be arranged into a third communication group representing native speakers of the lingua franca that also possess a level of proficiency in a second language that is the native language of a participant in the second communication group. The third communication group preferably represents people with equal proficiency in the second language, but may alternatively represent a group of people where each person has a different level of proficiency in the second language. Alternatively, the participants of the simulation may be arranged into any suitable combination of the group types described above or any other suitable group type that provides communication relationships substantially similar to those seen within a group of people of varied language and/or cultural backgrounds. The step of assigning the participants to a first and second communication groups Step S103 preferably includes the step of assigning each participant to one of the first and second communication groups. Alternatively, Step S103 may include the step of assigning a participant to more than one communication group. For example, a participant may be assigned to both the first and the second communication groups, representing a high proficiency of both the lingua franca and a second language. These participants may play the role of a translator within the simulation.

The step of providing a communication platform 110 that facilitates communication between the participants of the simulation to assemble unique subsets of an information set Step S105 functions to allow the participants of the simulation to communicate information to other participants of the simulation. The communication platform 110 preferably includes an input device 112 for communication input from one participant and an output device 114 for communication output to another participant. The communication platform 110 preferably facilitates communication of information through textual communication, but may alternatively facilitate communication of information through audio communication, tactile communication, visual communication, a combination of the above communication types, or any other suitable means of communication. The communication platform 110 is preferably a computer that includes a keyboard and/or a microphone as an input device 112 and a display as an output device 114. The communication platform 110 may alternatively be an audio system with a microphone as an input device 112 and a speaker as an output device 114, a visual system with a video receiver as an input device 112 and video output means (such as a television set) as an output device 114, a tactile system that transmits and receives tactile signals, or any other suitable combination of the communication platform variations described above or any other suitable communication platform. Alternatively, the communication platform 110 may include only one of the input device 112 and the output device 114. For example, the communication platform 110 may function to only output communication from other participants of the simulation to a participant, or may function to only allow input of communication from a participant to the other participants of the simulation. This variation may be similar to a communication dynamic experienced by a teacher in a lecture class where students listen to the information provided by the teacher with very little back and forth communication between the teacher and the student and may be useful in understanding difficulties experienced by a teacher who is teaching in a language that is not their native language or difficulties experienced by a student studying in a language that is not their native language. Each participant is preferably provided with a communication platform 110, and each of the plurality of communication platforms 110 is preferably connected to a network to communicate with the other communication platforms 110 through the Internet, through Ethernet, Bluetooth, WiFi, or any other suitable connection means. The communication platform 110 may alternatively be a piece of paper and a pen where a first participant draws or writes onto a piece of paper that is then passed to a second participant. However, any other suitable communication medium or platform that allows communication of information between the participants of the simulation may be used. In a first example, the communication platform 110 may take a video communication input from a participant and output the audio of the video input to another participant. In a second example, the communication platform 110 may take a textual communication input from a first participant, output an audio version of the textual communication to a second participant, and take an audio communication input from the second participant and output a textual version of the audio communication to the first participant. In a third example, the communication platform 110 may take textual communication input for each participant and output textual communication output to each participant. The communication platform 110 preferably may also include a processing unit that processes the communication between the participants of the simulation. The processing unit preferably also performs the step of selectively disadvantaging the communication of information between a subset of the participants Step S107.

The step of selectively disadvantaging the communication through the communication platform between a subset of the participants Step S107 functions to selectively increase the difficulty of interpretation of the communication from the first participant to the second participant, as shown in FIGS. 1, 2, 3a, 3b, and 3c. To increase interpretation difficulty, the communication input provided by the first participant to the second participant of the simulation is preferably selectively manipulated in one of several method variations.

In a first variation, the communication input is scrambled. As a textual example, select characters and/or words of a textual communication input from the first participant are switched and then outputted to the second participant in scrambled form (e.g. "during this week" may be manipulated to become "uinrgd sith week"). In an audio example of the first variation, the audio signals of an audio communication input may be rearranged and outputted to the second participant in a scrambled audio communication. In a visual example, portions of a visual communication input (for example, frames of a video, a photograph, or a drawing) are distorted and outputted to the second participant.

In a second variation, the communication input is selectively replaced. As a textual example, select characters and/or words of a textual communication input may be replaced with other characters and/or words and then outputted to the second participant. The other characters and/or words that are used to replace the select characters and/or words of the textual communication may be completely unrelated to the select characters and/or words that are being replaced, but may alternatively be selected to increase ambiguity of the communication. For example, an original word of the textual communication input may be replaced with another word that is a synonym of the original word but with incorrect context (e.g. the English word "biweekly" was originally used in the communication to mean "twice a week" but is replaced with the word-phrase "every other week" because of the double meaning of "biweekly."). This type of replacement is substantially similar to communication interpretation difficulties experienced by a person communicating in a lingua franca that is not their native language that is only aware of one of multiple meanings of a certain word. In an audio example, portions of an audio communication may be replaced by similar sounding words (e.g. an audio communication of the word "crowd" may be replaced by an audio communication of the word "cloud"). In a visual example, letters and/or words of a textual communication may be shifted (e.g. "during this week" may be manipulated to become "week during this," "kdurin gthi week," or any combination thereof). In another example, body language present in a video communication may be replaced with ambiguous body language.

In a third variation, the speed of the communication input is selectively manipulated. In a textual example, the speed of input of a textual communication input by a first participant is slowed. This may be used to simulate the difficulty experienced by a person communicating in a non-native language. In this example, the communication platform 110 may receive communication input from the first participant at a typical communication input rate, but the communication platform 110 will incorporate a time lag between the time the first participant inputs the communication and when the communication platform 110 registers the input of the information. In an audio example, the speed of the output of a textual communication input to a second participant is slowed. This may be used to simulate the slower speed response from a person communicating in a lingua franca that is not their native language to a person for whom the lingua franca is their native language. In this example, similar to the textual example, the communication platform 110 may receive communication input from the first participant at a typical communication input rate but will incorporate a time lag between the time the first participant inputs the communication and when the communication is outputted to the second participant. In an audio and/or visual example, the speed of a portion of an audio or video communication may be increased to increase difficulty of interpretation of the audio or video communication. In this example, the speed of another portion of the audio or video communication may also be increased.

In a fourth variation, the communication is selectively obscured. In other words, the visibility, audibility, and/or readability of the communication are selectively manipulated. In a visual example, select portions of a visual communication input (for example, a photograph, a video, or a drawing) from a first participant are obscured and then outputted to the second participant. In the variation of the simulation S100 that utilizes video communication, portions of the video that display another participant's body language may be obscured to provide the communication dynamic of not understanding body language that may be specific to another person's cultural background. In an audio example, audio noise is introduced to an audio communication input that obscures select portions of the audio communication input. In a textual example, letters and/or words of a textual communication may be blacked out to become unintelligible (e.g. "during this week" may be manipulated to become "during #### week"). In another audio example, the volume of select portions of an audio communication input is decreased to increase interpretation difficulty of the audio communication. In another example, select portions of a communication from a first participant may be completely deleted or blanked out and then outputted to the second participant.

The step of selectively disadvantaging the communication of information between a subset of the participants Step S107 is preferably performed in one of the four variations described above, but may alternatively be of any suitable combination or any other suitable method to disadvantage communication between a subset of the participants.

Figure 3A:
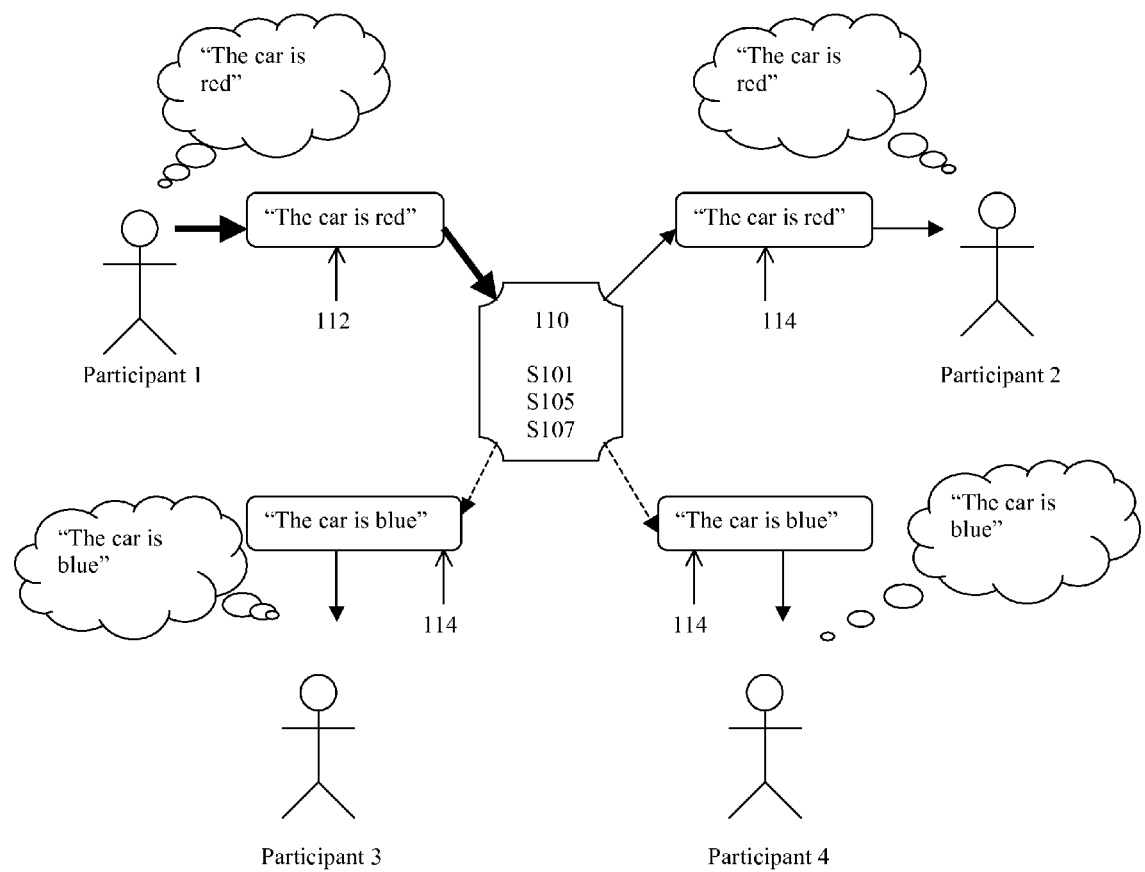
FIGS. 3a, 3b, and 3c are schematic representations of the communication between the participants assigned into the groups within the simulation.
Figure 3B:
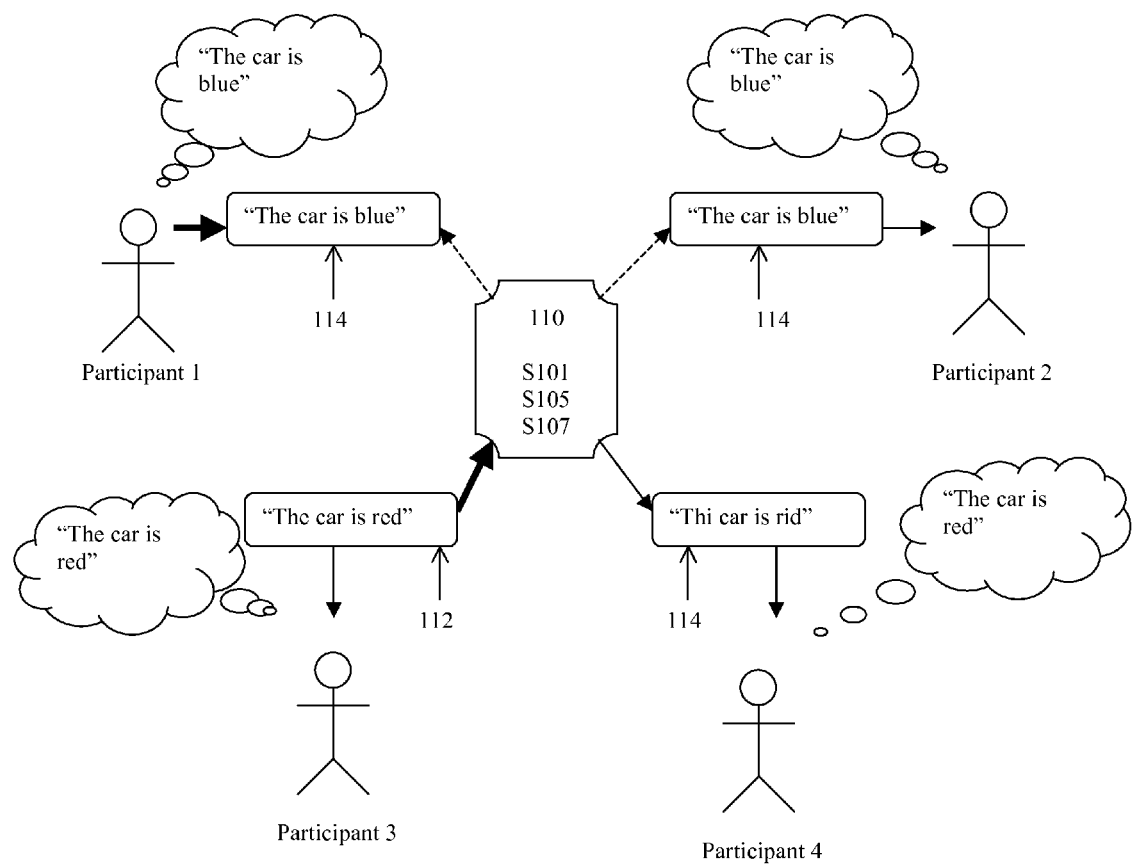

The step of selectively disadvantaging the communication through the communication platform between a subset of participants Step S107 also functions to provide a cross-cultural dynamic that is substantially similar to a communication dynamic that is present during communication within a group of people of varied language and/or cultural backgrounds. Step S107 preferably disadvantages communication of information between a subset of participants in one of several arrangements, as shown in FIGS. 2 and 3a-3c for a four-participant simulation and exemplified by the manipulation of the phrase "The car is red." Though arrangements for a four-participant simulation are shown, there may be any other suitable number of participants. As shown in FIGS. 3a and 3b, Step S107 preferably disadvantages communication of information from participants in the first communication group to the participants in the second communication group and preferably also disadvantages communication of information from participants in the second communication group to the participants in the first communication group. For example, the phrase "The car is red" as inputted by Participant 1, is outputted as "The car is blue" to Participants 3 and 4. Communication between participants in the first communication group is preferably not disadvantaged and such communication is preferably transmitted in its original form between participants in the first communication group. This functions to provide a communication dynamic substantially similar to a communication dynamic present during communication using a lingua franca between native speakers of the lingua franca and non-native speakers of the lingua franca. As shown in FIGS. 3a and 3b, the degree of disadvantaging of the communication from the first communication group (Participants 1 and 2) to the second communication group (Participants 3 and 4) and from the second communication group to the first communication group is preferably substantially equal. In other words, communication from a participant in the second communication group to a participant in the first communication group is of a substantially similar level of interpretation difficulty as communication from a participant in the first communication group to a participant in the second communication group. Alternatively, in the variation of the simulation S100 where the second communication group represents a group of people where each person has a different level of proficiency in the lingua franca, communication from a participant in the first communication group may be disadvantaged to different degrees for each participant in the second communication group. For example, Participant 4 that represents a person with a higher proficiency in the lingua franca than Participant 3 will have a lower level of interpretation difficulty of the communication from Participant 1 in the first communication group.

Also as shown in FIG. 3b, Step S107 preferably also disadvantages communication of information from a participant in the second communication group to another participant in the second communication group. This functions to provide a communication dynamic substantially similar to one that is present when non-native speakers of a lingua franca communicate to each other using the lingua franca. The degree of disadvantaging of the communication of information between Participant 3 and 4 of the second communication group is preferably less than the degree of disadvantaging of the communication of information across communication groups. In other words, the level of interpretation difficulty of communication in between participants within the second communication group is less than communication across communication groups. For example, the phrase "The car is red" as inputted by Participant 3 may be outputted as "Thi car is rid" to Participant 4, which is disadvantaged but the intended meaning may be relatively easily inferred with the context. This difference in the degree of disadvantaging may be useful in providing the communication dynamic that results from non-native speakers of a lingua franca having a similar understanding of the lingua franca that may result from having learned the lingua franca as a second language as opposed to a first and native language. The degree of disadvantaging of the communication between participants within the second communication group may alternatively be substantially equal to (or even less than) that of communication across communication groups. In fact, any other suitable combination or arrangement of disadvantaging or degree of disadvantaging may be used.

Figure 3C:
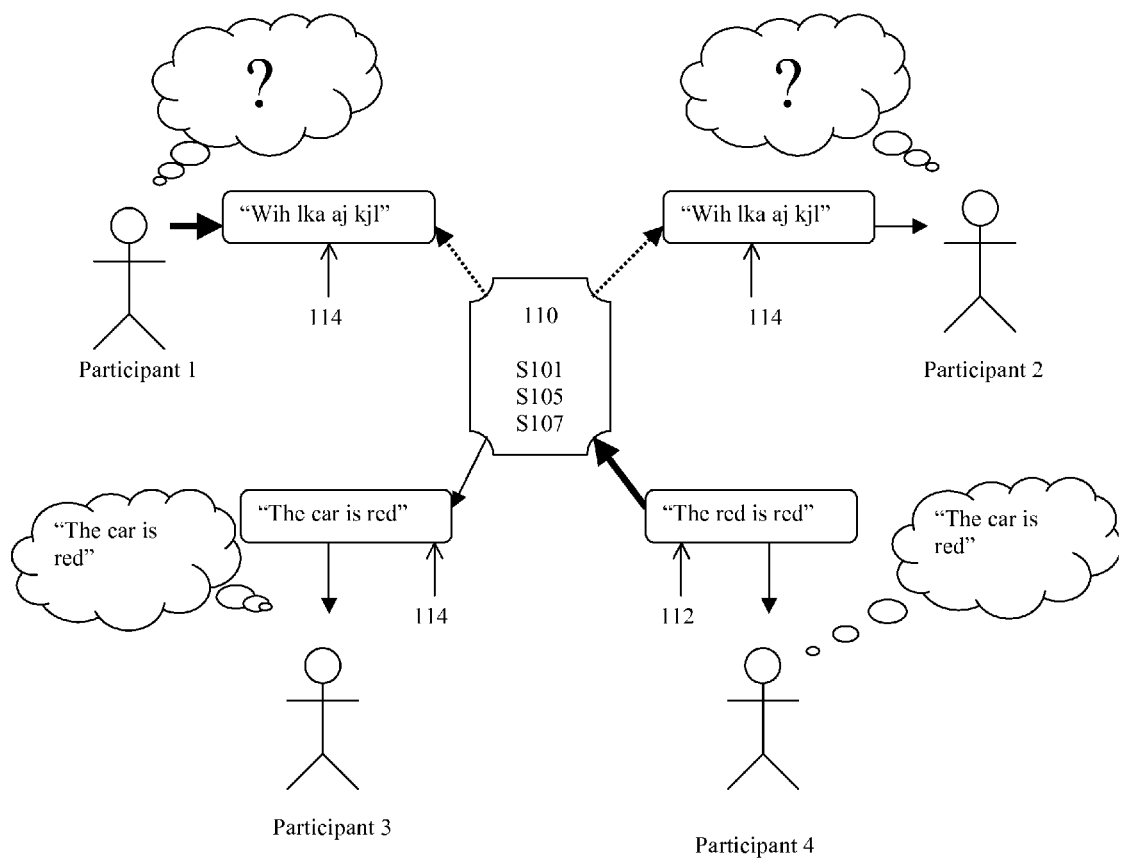

As shown in FIG. 3c, in the variation of simulation S100 where the second communication group represents people for whom the lingua franca is a second language and who share a common native language (that is not the lingua franca), Step S107 preferably also includes the step of providing an alternative communication mode to the participants of the second communication group of communicating in this common native language. When Participant 4 from the second communication group selects to activate the alternative communication mode, communication from Participant 4 to Participant 3 is preferably no longer disadvantaged and the original communication input provided by Participant 4 is outputted to Participant 3. Because the first communication group represents people for whom the lingua franca is the native language, communication from Participant 3 when communicating in the common language that is not the lingua franca is preferably substantially unintelligible to Participant 1 and Participant 2 of the first communication group. For example, the phrase "The car is red" Participant 4 is outputted as "Wih lka aj kjl" to Participant 1, which is completely unintelligible. However, any other degree or arrangement of disadvantaging may be used to provide the communication dynamic of the inability to understand communication in an unknown language and/or the communication dynamic of communicating in a language of higher familiarity may be used.

Figure 5A:
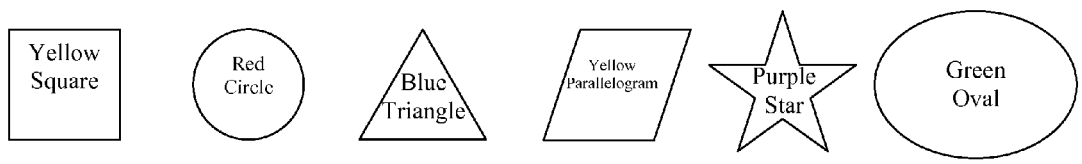
FIGS. 5a and 5b are a complete information set and unique subsets of the complete information set, respectively.
Figure 5B:
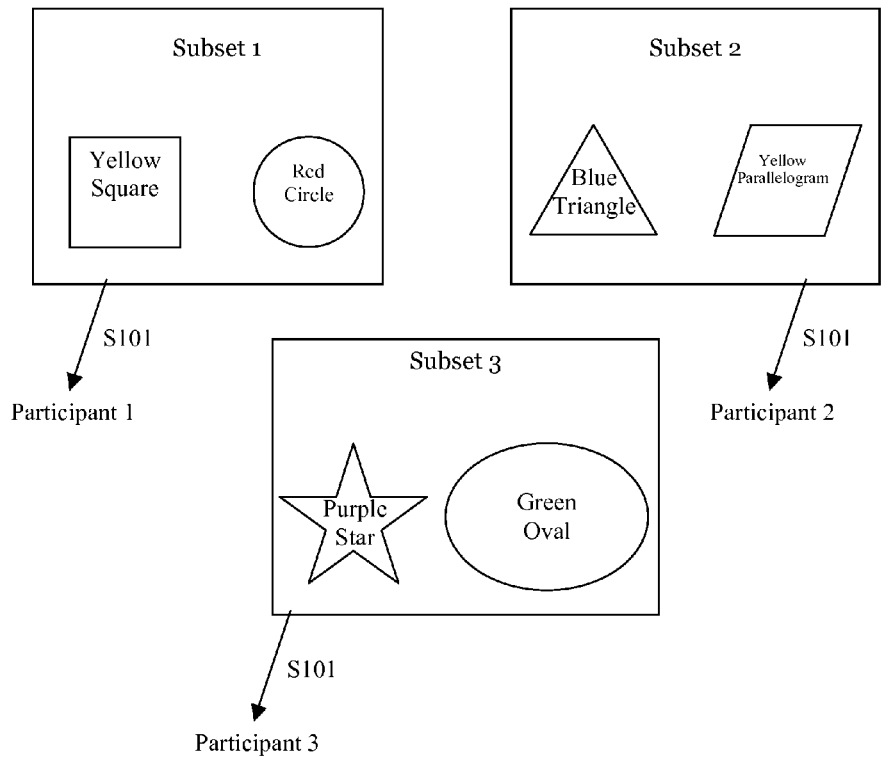

The step of distributing unique subsets of the information set to the participants Step S101 is preferably conducted by the communication platform 110 provided in Step S105. In the variation of the simulation S100 that includes a processing unit 116, the processing unit 116 preferably includes a complete information set (as shown in FIG. 5a) that the processing unit 116 preferably splits into unique subsets of information (as shown in FIG. 5b) and then distributes the unique subsets of information to the participants. In the variation of the communication platform 110 that includes one of the input device 114 and the output device 116, the processing unit 116 preferably distributes the complete information set to a first participant and no information to the other participants of the simulation. However, any other suitable means and/or method of distributing unique subsets of information may be used. The unique subsets of information may also contain contradictory information, for example, one subset may include a first number value for a particular detail from the complete information set while another subset may include a second number value for the same particular detail from the complete information set. The contradictory information may be used to increase the complexity of the communication that takes place in between the participants of the simulation. However, any other suitable arrangement of the complete information set and the unique subsets of the information may be used.

Figure 4:
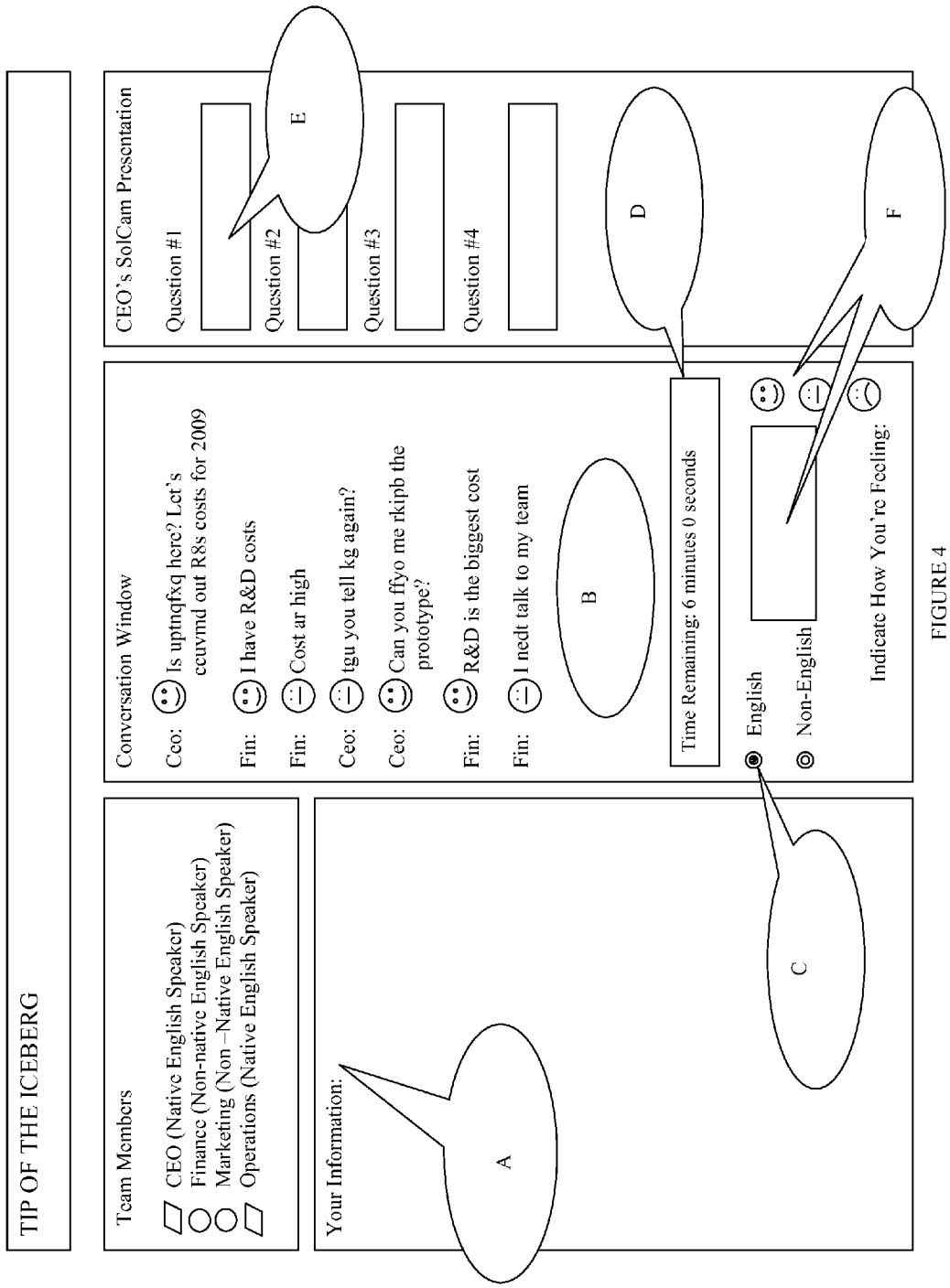
FIG. 4 is an Exemplary Simulation and an Exemplary Simulation interface for the simulation.

As shown in FIG. 4, an Exemplary Simulation and Exemplary Simulation interface is provided on a computer as the communication platform 110. As referenced as BOX A, the participants of the simulation have been assigned roles in a corporate scenario. In this Exemplary Simulation, the Chief Executive Officer and the Chief Operations Officer have been assigned to the first communication group and the Chief Financial Officer and the Chief Marketing Officer have been assigned to the second communication group. Each of the participants is provided with unique information and the CEO has been assigned the task of assembling all the information from the other participants. As referenced as Box B, the display includes the communication from the point of view of the CFO. Because the CFO is of the second communication group, communication from the CEO (of the first communication group) has been disadvantaged and is difficult to understand. All communication between the participants of the simulation is preferably displayed in the appropriate manipulated form, as is the case during a group meeting or a conference call. The collective communication as referenced as Box B, between the participants of the simulation as seen by other participants of the simulation is preferably different for each participant and is preferably manipulated appropriately for each participant depending on the communication group assignment of the participant.

As referenced as Box C, the CFO has the option of selecting an alternative communication mode, which may allow unhindered communication with the CMO executive (also of the second communication group). As referenced as Box D, a time constraint has been implemented to provide a stimulus to complete the assembling of the information. As referenced as Box E, the information that has been assembled by the CEO is visible to all the participants of the simulation. This functions to inform the participants of the simulation how much information has been assembled as well as the accuracy of the information. Inaccuracies of the assembled information may also provide additional stimulus for participants of the simulation to communicate the accurate information to the CEO. As referenced as Box F, the CFO is allowed to input text through a text box and to select an emoticon representing the current emotional status.

An alternative embodiment preferably implements the above simulation in a computer-readable medium storing computer-readable instructions. The instructions are preferably executed by computer-executable components for acquiring and processing ultrasound data. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device As a person skilled in the art will recognize from the previous detailed description and from the figures and claims, modifications and changes can be made to the preferred embodiments of the invention without departing from the scope of this invention defined in the following claims.

I claim:

1. A method for simulating a cross cultural communication dynamic between a first, second, third, and fourth participant associated with a first, second, third, and fourth input device and output device, respectively, wherein the first, second, third, and fourth participants are fluent in a common language, the method comprising:
    receiving a first text input in the common language from the first participant from the first input device;
    generating a first output by replacing select words of the first text input with a communication system;
    substantially simultaneously transmitting the first text input to the second output device for presentation to the second participant
    and transmitting the first output to the third output device for presentation to the third participant;
    receiving a second text input in the common language from the fourth participant in a first mode from the fourth input device;
    generating a second output by replacing all the words of the second text input with the communication system;
    substantially simultaneously transmitting the second output to the first and second output devices for presentation to the first and second participants, respectively,
    and transmitting the unaltered second text input to the third output device for presentation to the third participant;
    receiving, at a speed slower than second text input receipt, a third text input in the common language from the fourth participant in a second mode from the fourth input device;
    generating a third output by replacing select words of the third text input to a second degree with the communication system;
    transmitting the third output to the third output device for presentation to the third participant;
    generating a fourth output by replacing select words of the third text input to a third degree with the communication system; and
    transmitting the fourth output to the second output device for presentation to the second participant.

2. The method of claim 1, further comprising:
    monitoring a frequency of text input receipt from the first participant; and
    varying the first degree of word replacement based on the monitored frequency of text input receipt, wherein the proportion of first text input words replaced in the first output is decreased when the frequency of text input receipt decreases.

3. The method of claim 1, further comprising:
    monitoring a frequency of text input receipt from the fourth participant; and
    varying the second and third degrees of word replacement based on the monitored frequency of text input receipt.

4. The method of claim 1, further comprising:
    transmitting the fourth output to the first output device for presentation to the first participant;
    monitoring a frequency of text input receipt from the first participant; and
    varying the third degree of word replacement based on the monitored frequency of text input receipt, wherein the degree of third text input word replacement in the fourth output is decreased when the frequency of text input receipt decreases.

5. The method of claim 1, further comprising:
    monitoring word difficulty of text input received from the first participant from the first input device; and
    varying the first degree of word replacement based on the monitored word difficulty, wherein the degree of first text input word replacement in the first output is decreased when the difficulty of monitored words decreases.

6. The method of claim 1, further comprising:
    monitoring an emotion of the first, second, third, and fourth participants; and
    decreasing the first, second, and third degrees of word replacement when the monitored emotions of the first, second, third, and fourth participants are determined as more positive.

7. The method of claim 1, further comprising:
    receiving a fourth text input from the third participant in the first mode from the third input device,
    transmitting the fourth text input to the fourth output device for presentation to the fourth participant;
    generating a fifth output from the fourth text input by replacing all words of the fourth text input;
    transmitting the fifth output to the first and second output devices for presentation to the first and second participants, respectively;
    receiving, at a speed slower than fourth text input receipt, a fifth text input from the third participant in the second mode from the third input device;
    generating a sixth output from the fifth text input by replacing select words of the fifth text input to a fourth degree;
    transmitting the sixth output to the fourth output device for presentation to the fourth participant;
    generating a seventh output from the fifth text input by replacing select words of the fifth text input to a fifth degree; and
    transmitting the seventh output to the second output device for presentation to the second participant.

8. The method of claim 7, further comprising:
    receiving a sixth text input from the second participant from the second input device;
    transmitting the sixth text input to the first output device for presentation to the first participant;
    generating a eighth output by replacing select words of the sixth text input to a sixth degree; and
    transmitting the eighth output to the third output device for presentation to the third participant.

9. The method of claim 8, further comprising:
    transmitting the first output to the fourth output device for presentation to the fourth participant;
    transmitting the fourth output to the first output device for presentation to the first participant;
    transmitting the seventh output to the first output device for presentation to the first participant; and
    transmitting the eighth output to the fourth output device for presentation to the fourth participant.

10. The method of claim 8, wherein the third and fifth degrees of word replacement are higher than the second and fourth degrees of word replacement, such that the fourth output comprises more replaced words than the third output and the seventh output comprises more replaced words than the sixth output.

11. The method of claim 8, wherein the third and fourth outputs comprise the same text and the sixth and seventh outputs comprise the same text.

12. The method of claim 8, further comprising distributing a first, second, third and fourth unique subset of an information set to the first, second, third, and fourth participants, respectively; and assigning the first participant with the task of assembling the unique information from the second, third, and fourth participants based on the second output, the seventh output, and sixth text input.

13. The method of claim 12, wherein the first and second unique subsets of information contradict the third and fourth unique subsets of information.

14. The method of claim 12, further comprising presenting the assembled information to the second, third, and fourth participants.

15. The method of claim 1, wherein replacing select words comprises replacing each selected word with a scrambled version of the word.

16. The method of claim 1, wherein replacing select words comprises replacing each selected word with a word comprising randomly selected letters.

17. The method of claim 1, further comprising displaying a representation of an amount of time remaining of a given time constraint.

18. A method for simulating a cross-cultural dynamic between a first, second, third and fourth participant associated with a first, second, third, and fourth input device and output device, respectively, the method comprising:
   receiving a first communication input from the first participant from the first input device;
   generating a first output by replacing a portion of the first communication input by a communication system;
   substantially simultaneously transmitting the first communication input to the second output device for presentation to the second participant and transmitting the first output to the third and fourth output device for presentation to the third and fourth participants, respectively;
   receiving a second communication input from the second participant from the second input device;
   generating a second output by replacing a portion of the second communication input by the communication system;
   substantially simultaneously transmitting the second communication input to the first output device for presentation to the first participant and transmitting the second output to the third and fourth output devices for presentation to the third and fourth participants, respectively;
   receiving a third communication input from the third participant in a first mode from the third input device;
   generating a third output by replacing all of the third communication input by the communication system;
   substantially simultaneously transmitting the third communication input to the fourth output device for presentation to the fourth participant and transmitting the third output to the first and second output devices for presentation to the first and second participants, respectively;
   receiving, at a slower rate than third communication input receipt, a fourth communication input from the third participant in a second mode from the third input device;
   generating a fourth output by replacing a portion of the fourth communication input by the communication system;
   transmitting the fourth output to the first, second, and fourth output devices for presentation to the first, second, and fourth participants, respectively;
   receiving a fifth communication input from the fourth participant in the first mode from the fourth input device;
   generating a fifth output by replacing all of the fifth communication input by the communication system;
   substantially simultaneously transmitting the fifth communication input to the third output device for presentation to the third participant and transmitting the fifth output to the first and second output devices for presentation to the first and second participants, respectively;
   receiving, at a slower rate than fifth communication input receipt, a sixth communication input from the fourth participant in the second mode from the fourth input device;
   generating a sixth output by replacing a portion of the sixth communication input by the communication system; and
   transmitting the sixth output to the first, second, and third output devices for presentation to the first, second, and third participants, respectively.

19. The method of claim 18, further comprising monitoring a communication input receipt frequency for the first, second, third, and fourth participants; and decreasing the portions of communication input replaced in the first, second, fourth, and sixth outputs when the communication input receipt frequency for the first second, third and fourth participants decrease.

20. The method of claim 18, further comprising monitoring word difficulty for the first, second, third, and fourth participants; and decreasing the first, second, third, and fourth degrees of word replacement when the word difficulty decreases.

21. The method of claim 18, wherein the first, second, third, fourth, fifth, and sixth communication inputs comprise text inputs.

* * * * *